United States Patent [19]

Ohta

[11] Patent Number: 4,825,289

[45] Date of Patent: Apr. 25, 1989

[54] NOISE REDUCTION APPARATUS FOR VIDEO SIGNAL

[75] Inventor: Haruo Ohta, Yawata, Japan

[73] Assignee: Matsushita Electric Industrial Co., Ltd., Osaka, Japan

[21] Appl. No.: 119,065

[22] Filed: Nov. 10, 1987

[30] Foreign Application Priority Data

Nov. 11, 1986 [JP] Japan .................. 61-268007

[51] Int. Cl.⁴ .............................................. H04N 5/21
[52] U.S. Cl. ...................................... 358/167; 358/36; 358/340
[58] Field of Search .................. 358/36, 167, 166, 340, 358/328

[56] References Cited

U.S. PATENT DOCUMENTS

| | | | |
|---|---|---|---|
| 4,009,334 | 2/1977 | Sypula | 358/36 |
| 4,015,076 | 3/1977 | Ishiodori | 358/167 |
| 4,058,836 | 11/1977 | Drewery et al. | 358/167 |
| 4,302,768 | 11/1981 | Kamura et al. | 358/36 |
| 4,562,470 | 12/1985 | Dinh et al. | 358/167 |
| 4,652,922 | 3/1987 | Ozaki | 358/167 |
| 4,706,113 | 11/1987 | Ito et al. | 358/37 |

FOREIGN PATENT DOCUMENTS 55-80966 6/1980 Japan .

Primary Examiner—James J. Groody
Assistant Examiner—John K. Peng
Attorney, Agent, or Firm—Wenderoth, Lind & Ponack

[57] ABSTRACT

A noise reduction apparatus includes a vertical filter for extracting a component having a high vertical frequency from an input video signal, a two-dimensional filter for extracting a component having a low vertical frequency and a high horizontal frequency from the input video signal, a detector for detecting a vertical line image portion from output components of the vertical filter and the two-dimensional filter, and a controllable two-dimensional filter which suppresses a component having a high vertical frequency at the vertical line image portion according to a detection signal from the dector. By this apparatus, the noise superposed on the vertical line image signal is effectively reduced without deteriorating the vertical resolution.

16 Claims, 8 Drawing Sheets

DETECTION SIGNAL

DETECTION SIGNAL

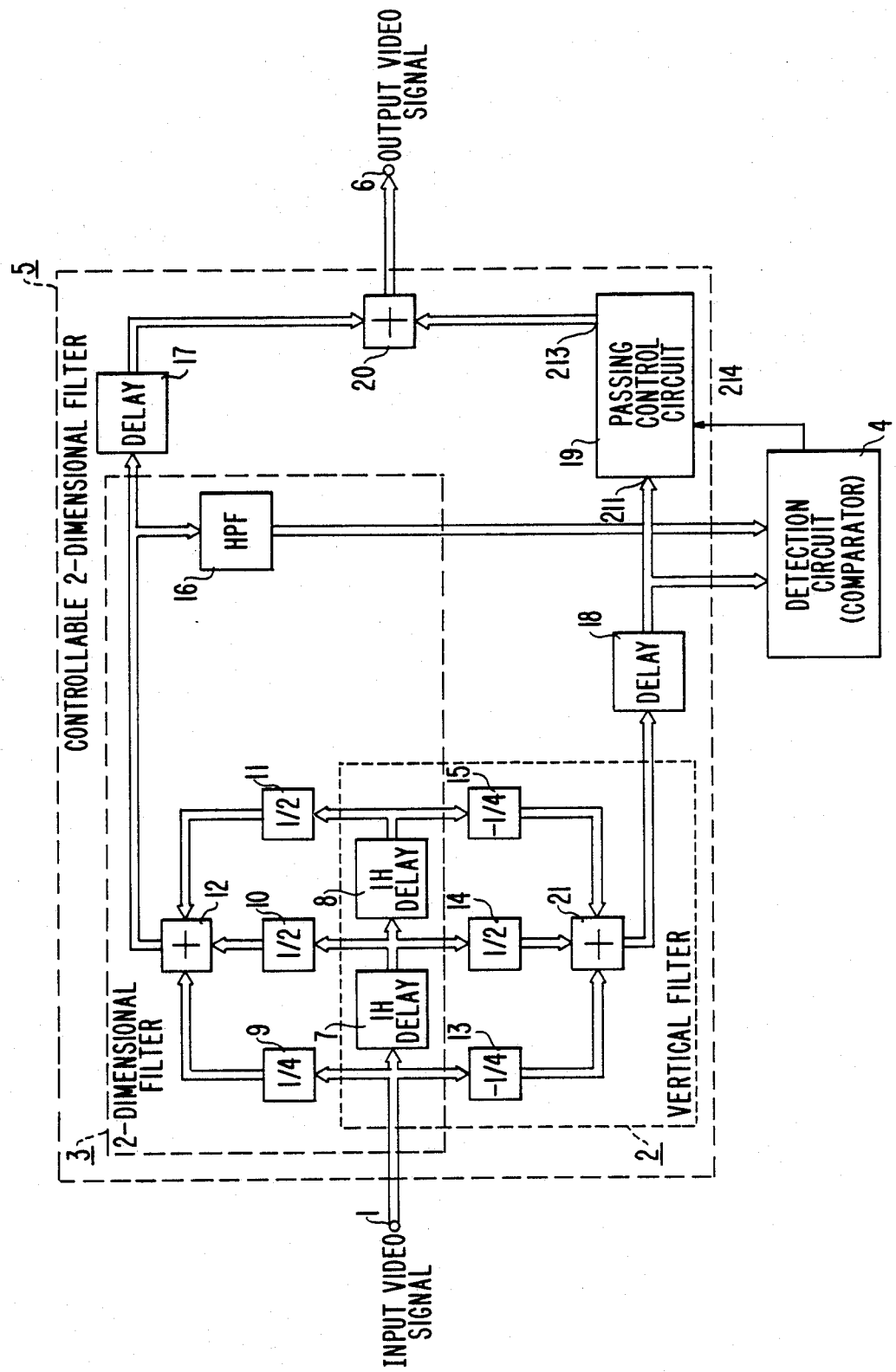

NOISE REDUCTION APPARATUS FOR VIDEO SIGNAL

BACKGROUND OF THE INVENTION

1. Field of the Invention:

The present invention relates to a NOISE REDUCTION APPARATUS for reducing noise of video signals for use in a video signal recording/reproducing system such as a video tape recorder and the like.

2. Description of the Prior Art:

The video tape recorders (VTR) which are extensively used in general in recent years are provided with various noise reducing circuits in order to reduce noises which are mixed in reproduced luminance signals.

A typical one of such circuits is to take out a high-frequency component including noise from an input signal, limits the amplitude of it with a limiter, and substracts the amplitude-limited high-frequency component from the input signal. By this circuit, noise component of small amplitude is reduced without deteriorating high-frequency signal component which was a large amplitude. That is to say, without deteriorating the horizontal resolution of the image, noise on the flat area can be reduced.

However, when, for example, there is a sharply rising vertical line image on an image, the signal portion to represent this vertical line image is subjected to amplitude limitation by the limiter, so that it is impossible to reduce the noise at this portion, and eyesore noise remains.

For reducing such noise at the vertical line image portion of the image, there is a circuit so designed as to take out a high-frequency component of vertical frequency of the image from the input signal, limits its amplitude, and subtract it from the input signal (U.S. Pat. No. 4,302,768). When this circuit is used, because the signal portion representing the vertical line image does not include the high-frequency comnponent of vertical frequency, only the noise component passes through the limiter, so that there is a possibility to reduce the noise at this portion.

In fact, however, because the amplitude of the noise component of the high-frequency region of vertical frequency at the vertical line image portion is relatively large, the noise component does not fully pass through the limiter, and thus it is not possible to reduce sufficiently this sort of noise. When the passing amplitude of the limiter is enlarged so as to reduce this sort of noise, the vertical resolution of the image is inevitably deteriorated.

SUMMARY OF THE INVENTION

An object of the present invention is to provide a NOISE REDUCTION APPARATUS for effectively reducing the noise at the vertical line image portion as aforedescribed without deteriorating the vertical resolution of the image.

Another object of the present invention is to provide a NOISE REDUCTION APPARATUS for effectively reducing both the noise at the vertical line image portion of an image and the noise at the flat portion of the image.

Accordingly, a NOISE REDUCTION APPARATUS of the present invention comprises a vertical filter means for extracting a component which is high in vertical frequency of an input video signal, a two-dimensional filter means for extracting a component of the input video signal which is low in vertical frequency and high in horizontal frequency, a detecting means which detects amplitudes of an output signal of said vertical filter means and an output signal of said two-dimensional filter means and outputs a detection signal according to those signal amplitudes, and a controllable two-dimensional filter means which outputs a signal with reduced noise by suppressing the high vertical frequency component of said input video signal according to the detection signal.

BRIEF DESCRIPTION OF THE DRAWINGS

FIG. 9 is a block diagram showing the fourth embodiment of the present invention.

DESCRIPTION OF THE PREFERRED EMBODMIENTS

Before describing the present invention, explanation will be given on the aforedescribed noise at the vertical line image in the two-dimensional frequency region in reference to FIG. 1.

The signal of the vertical line image has a spectrum in a high region 401 of horizontal frequency of the axis of vertical frequency=0. Against this, the noise component superposed on the signal of the vertical line image has a spectrum of a relatively high vertical frequency not on the axis of vertical frequency=0. Accordingly, when a filter to suppress a high-range component of vertical frequency such as a region 402 is used, this noise can be reduced. The vertical line image portion can be detected by comparing the amplitude of the signal component which is low in vertical frequency and high in horizontal frequency with the amplitude of the signal component which is high in vertical frequency. If the noise of high vertical frequency is suppressed only at this vertical line image portion, then it becomes possible to reduce the noise at the vertical line image portion regardless of noise amplitude without deteriorating the vertical resolution of an image.

Figure 1:
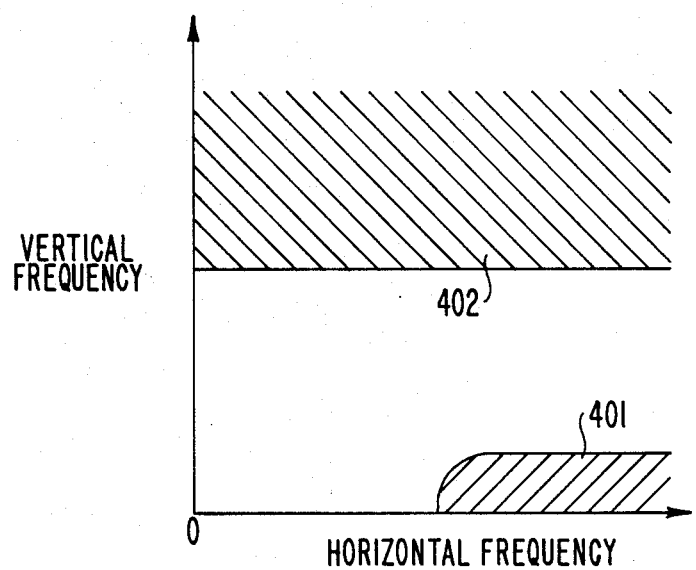
FIG. 1 is a diagram for illustrating the operation in the two-dimensional frequency region.
Figure 2:
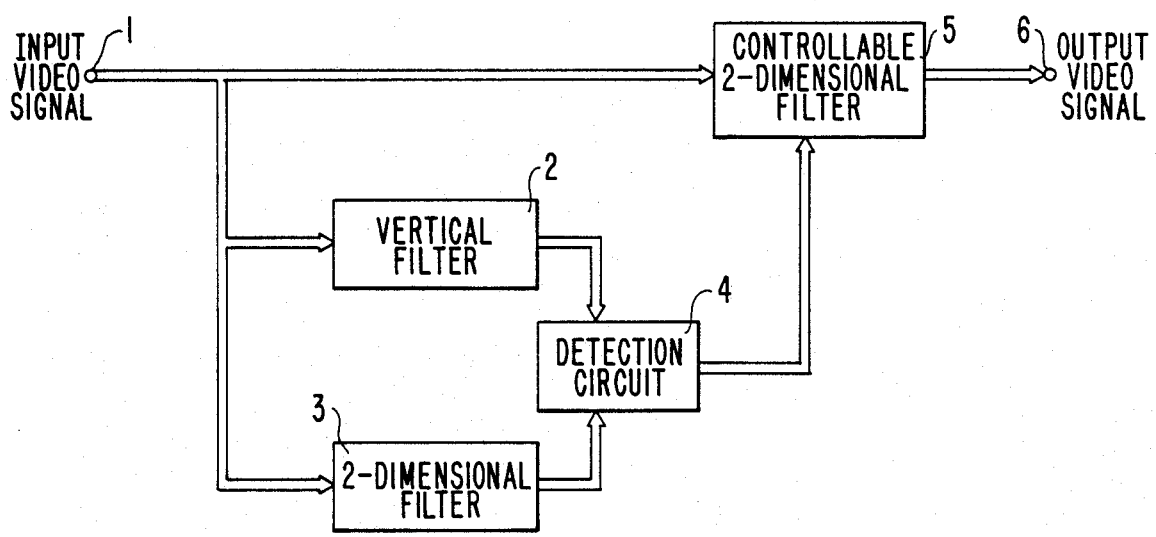
FIG. 2 is a block diagram showing the first embodiment of the present invention.

FIG. 2 shows a block diagram of the first embodiment which is a basic construction of the present invention. In FIG. 2, an input video signal inputted through an input terminal 1 is fed to both a vertical filter 2 for taking out a component which is high in vertical frequency in the region 402 in FIG. 1 and a two-dimensional filter 3 for taking out a component which is low in vertical frequency and high in horizontal frequency in the region 401 in FIG. 1. Output signals of the vertical filter 2 and the two-dimensional filter 3 are inputted to a detection circuit 4. The detection circuit 4 detects a vertical line image portion from the amplitudes of the two input signals and outputs a detection signal. On the other hand, the input video signal inputted through the input terminal 1 is led also to a controllable two-dimensional filter 5 which outputs, when the detection signal indicates that the vertical line image portion is detected, a video signal in which the component in the region 402 in FIG. 1 is suppressed. The output video signal of the controllable two-dimensional filter 5 having reduced noise is outputted from an output terminal 6.

As described above, according to the present invention, the amplitude of the signal component which is low in vertical frequency and high in horizontal frequency is compared with the amplitude of the signal component which is high in vertical frequency thereby to detect a vertical line image portion, and the noise of high vertical frequency is suppressed only at this vertical line image portion. Accordingly, it becomes possible to reduce the noise superposed on the signal at the vertical line image portion without deteriorating the vertical resolution of the image.

The more concrete other embodiments of the present invention will be described hereunder. In the following embodiments, the signals are all digitalized signals, and the construction elements are all digital circuits.

Firstly, explanation will be given on the second embodiment of the present invention.

Figure 3:
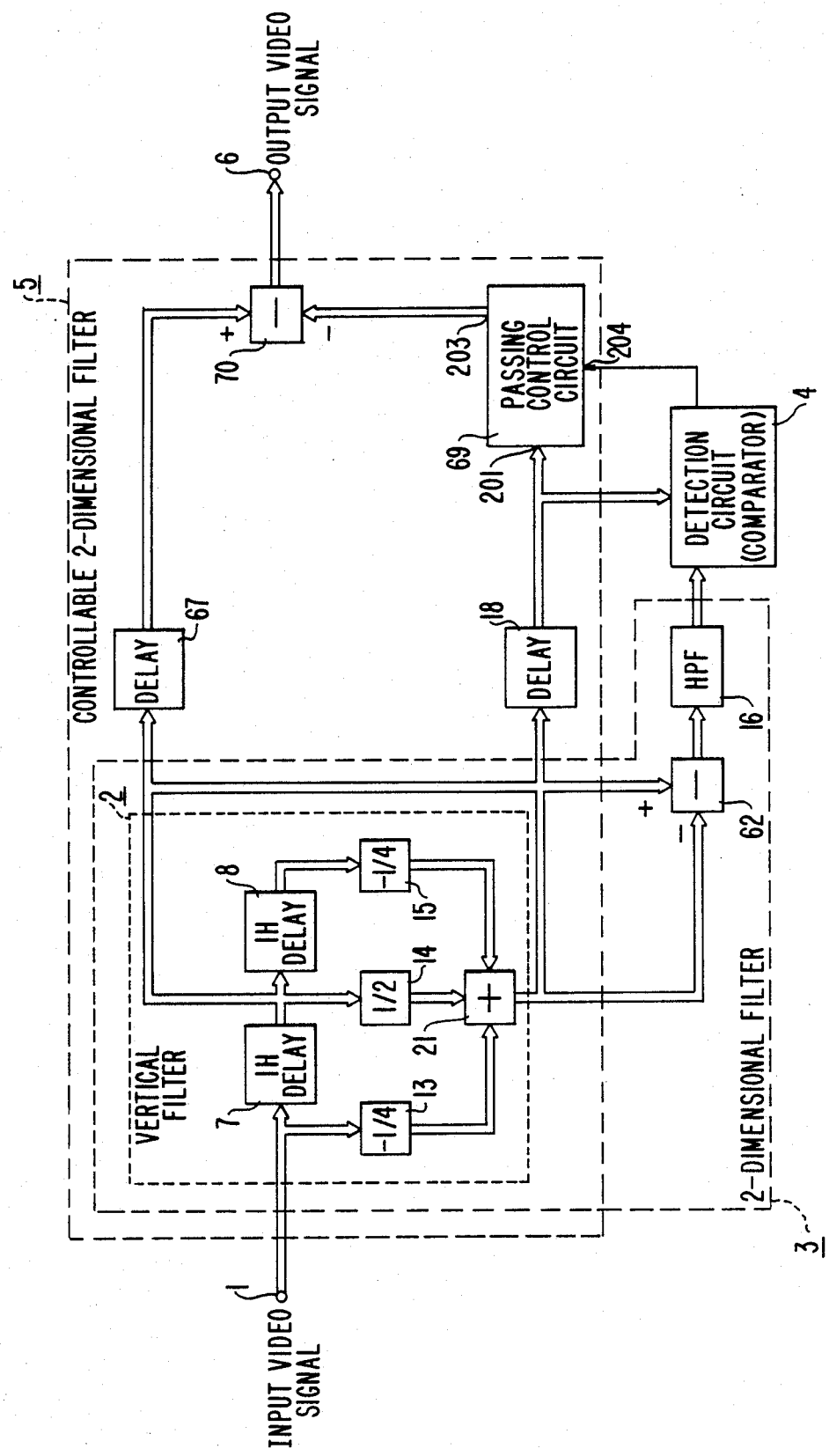
FIG. 3 is a block diagram showing the second embodiment of the present invention.

FIG. 3 is block diagram of the second embodiment of the present invention. In FIG. 3, the blocks having the same functions as those of the embodiment of FIG. 1 are given the same numbers. An input digital video signal inputted through the input terminal 1 is fed to both the vertical filter 2 and the two-dimensional filter 3. In the vertical filter 2, the input video signal is delayed by 1 horizontal scanning period (1H) by a 1H delay circuit 7, and further delayed by 1H by a 1H delay circuit 8. The input video signal, the output signal of the 1H delay circuit 7 (1H-delayed video signal) and the output signal of the 1H delay circuit 8 (2H-delayed video signal) are respectively multiplied by coefficients $-\frac{1}{4}$, $\frac{1}{2}$ and $-\frac{1}{4}$ by coefficient circuits 13, 14 and 15, and mixed by an addition circuit 21. The resultant output of the vertical filter 2 is a component of high vertical frequecy in the region 402 in FIG. 1. Also, the output of the vertical filter 2 is subtracted from the output of the 1h delay circuit 7 by a subtraction circuit 62, to obtain a mixed signal of the input video signal, the 1H-delayed video signal and the 2H-delayed video signal at the weight of the $\frac{1}{4}$, $\frac{1}{2}$ and $\frac{1}{4}$, respectively. This mixed signal is a component of low vertical frequency. By passing this mixed signal through a high-pass filter 16 in horizontal frequency, a component which is low in vertical frequency and high in horizontal frequency in the region 401 in FIG. 1, is taken out by the two-dimensional filter 3. The outputs of the vertical filter 2 and the two-dimensional filter 3 are inputted to a detection circuit 4. The output of the vertical filter 2, before inputted to the detection circuit 4, is delayed by a delay circuit 18 by a time corresponding to a delay time of the high-pass filter 16 to become equal in timing to the output of the two-dimensional filter 3. The detection circuit 4 comprises a level comparator for comparing the absolute values of the two signal amplitudes, and, when the output of the two-dimensional filter 3 is larger, it outputs a detection signal which indicates that the vertical line image portion is detected. The detection sigal is led to a passing control circuit 69 and controls passing of the output signal of the delay circuit 18. The output of the 1H delay circuit 7 is corrected in timing by the amount of the delay time of the high-pass filter 16 by a delay circuit 67, and the output of the passing control circuit 69 is subtracted from the output of the delay circuit 67 by a subtraction circuit 70. Accordingly, as an output of the controllable two-dimensional filter 5, a video signal with reduced noise is outputted from the output terminal 6.

Figure 4:
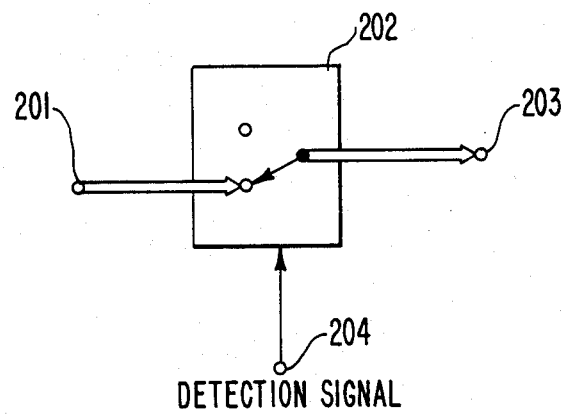
FIG. 4, FIG. 5 and FIG. 7 are construction diagrams of the passing control circuits in the second and the third embodiments of the present invention.

Here, the passing control circuit 69 is constructed, for example, as shown in FIG. 4. In FIG. 4, the signal inputted to an input terminal 201 of the passing control circuit 69 is outputted from an output terminal 203 thereof only when a switch 202 is closed. The switch 202 is controlled by the detection signal inputted from the detection circuit 4 to a detection signal input terminal 204 so as to be closed only when the vertical line image portion is detected.

When the vertical line image portion is not detected, i.e., when the signal amplitude of the region 401 in FIG. 1 is smaller than the signal amplitude of the region 402, the switch 202 is opened, and no signal is passed. Accordingly, at such time, the output of the delay circuit 67 having the sample amplitude as that of the input video signal is outputted from the output terminal 6, so that the vertical resolution is not deteriorated. On the contrary, when the vertical line image portion is detected, i.e., when the signal amplitude of the region 401 in FIG. 1 which corresponds to the vertical line image is larger than the signal amplitude of the region 402, the switch 202 is closed. Accordingly, in such a case, the controllable two-dimensional filter 5 suppresses the component in the region 402 in FIG. 1. In other words, it is possible to reduce the noise superposed on the vertical line image portion.

As described above, according to this emboidment, by controlling the passage of the component of high vertical frequency with reference to the signal amplitude of the component of low vertical frequency and high horizontal frequency, it is possible to reduce only the noise at the vertical line image portion of an image without deteriorating the vertical resolution of the image irrespective of the amplitude of the noise.

Figure 5:
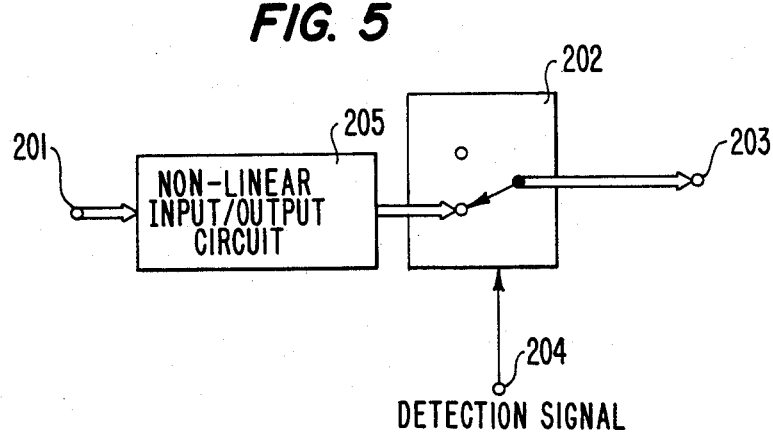
Figure 6:
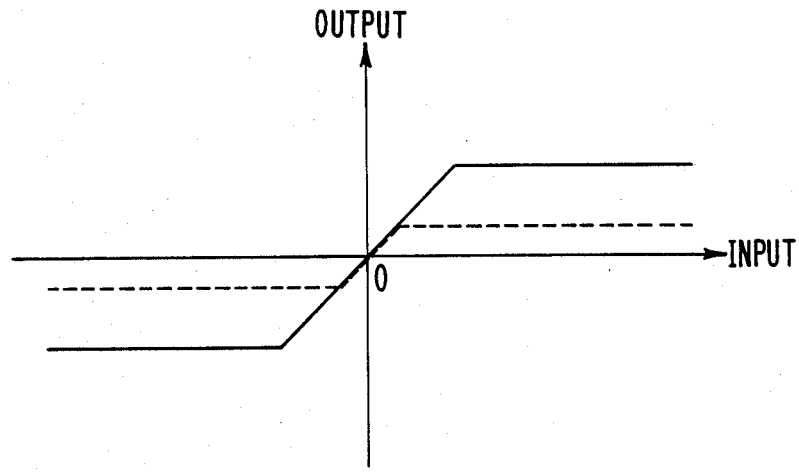
FIG. 6 is a diagram showing an example of the input-output characteristic of the non-linear input/output circuits 205 and 204 in FIG. 5 and FIG. 7.

In the above, the construction as shown in FIG. 4 is adopted for the passing control circuit 69 to control as to whether to allow passage of the input signal as such or not, but a construction as shown in FIG. 5 may be adopted. In the construction of FIG. 5, the signal inputted to the input terminal 201 of the passing control circuit 69 is connected to the switch 202 through a non-linear input/output circuit 205. The non-linear input/output circuit 205 is constructed, for example, by a memory which uses the input signal as an address, and stores prescribed output values corresponding to respective levels of the input signal to have an amplitude limitation characteristic as shown by a solid line in FIG. 6. By this circuit, although the signal amplitude in the region 401 is larger than that in the region 402, when a signal component having the large amplitude is included in the component in the region 402, deterioration of this signal component can be avoided.

Figure 7:
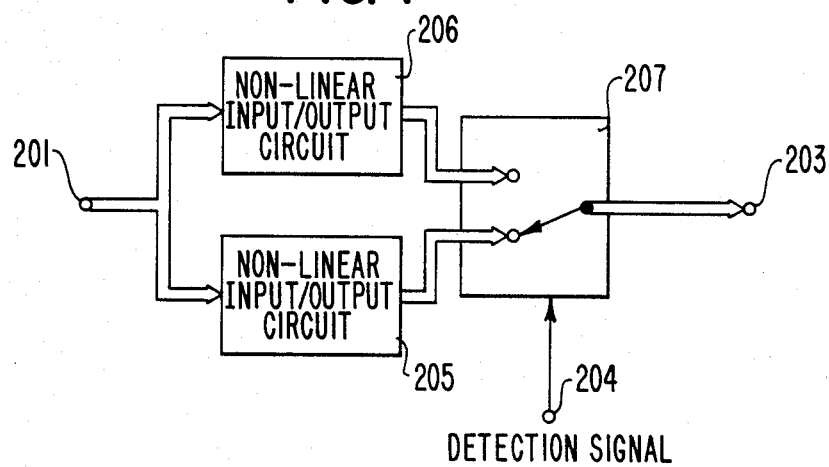

In the embodiment as described above, the noise superposed on the vertical line image portion of an image can be reduced, but the noise on the flat portion of the image cannot be reduced. Accordingly, when it is necessary to reduce also the noise on the flat portion of the image, the passing control circuit 69 may be constituted as shown in FIG. 7. In FIG. 7, the signal inputted to the input terminal 201 of the passing control circuit 69 is led to non-linear input/output circuits 205 and 206, and one of the outputs of the circuits 205 and 206 is selected by a switch 207 and outputted. The switch 207 is controlled by the detection signal inputted to the detection signal input terminal 204 from the detection circuit 4, and, when the detection signal shows that the vertical line image portion is detected, the switch selects the output of the non-linear input/output circuit 205, and in the cases other than that, it selects the output of the non-linear input/output circuit 206. Here, the non-linear input/output circuits 205, 206 are each constructed by a memory which uses the input signal as its address input and stores prescribed output values corresponding to respective levels of the input signal. The non-linear input/output circuit 205 has an input-output characteristic as shown by the solid line in FIG. 6, and the non-linear input/output circuit 206 has an input-output characteristic to pass only the signal of smaller amplitude as shown by a broken line in FIG. 6. By this construction, when the signal amplitude in the region 401 is larger than the signal amplitude in the region 402, it is possible to reduce the noise of relatively large amplitude superposed on the vertical line image portion of an image in the same manner as previously described. Further, even in the case where ths signal amplitude in the region 401 is smaller than the signal amplitude in the region 402, it is possible to reduce the noise component of small amplitude in the region 402. In other words, it is possible to reduce simultaneously the noise of small amplitude on the flat portion of the image.

Next, explanation will be given on the third embodiment of the present invention.

Figure 8:
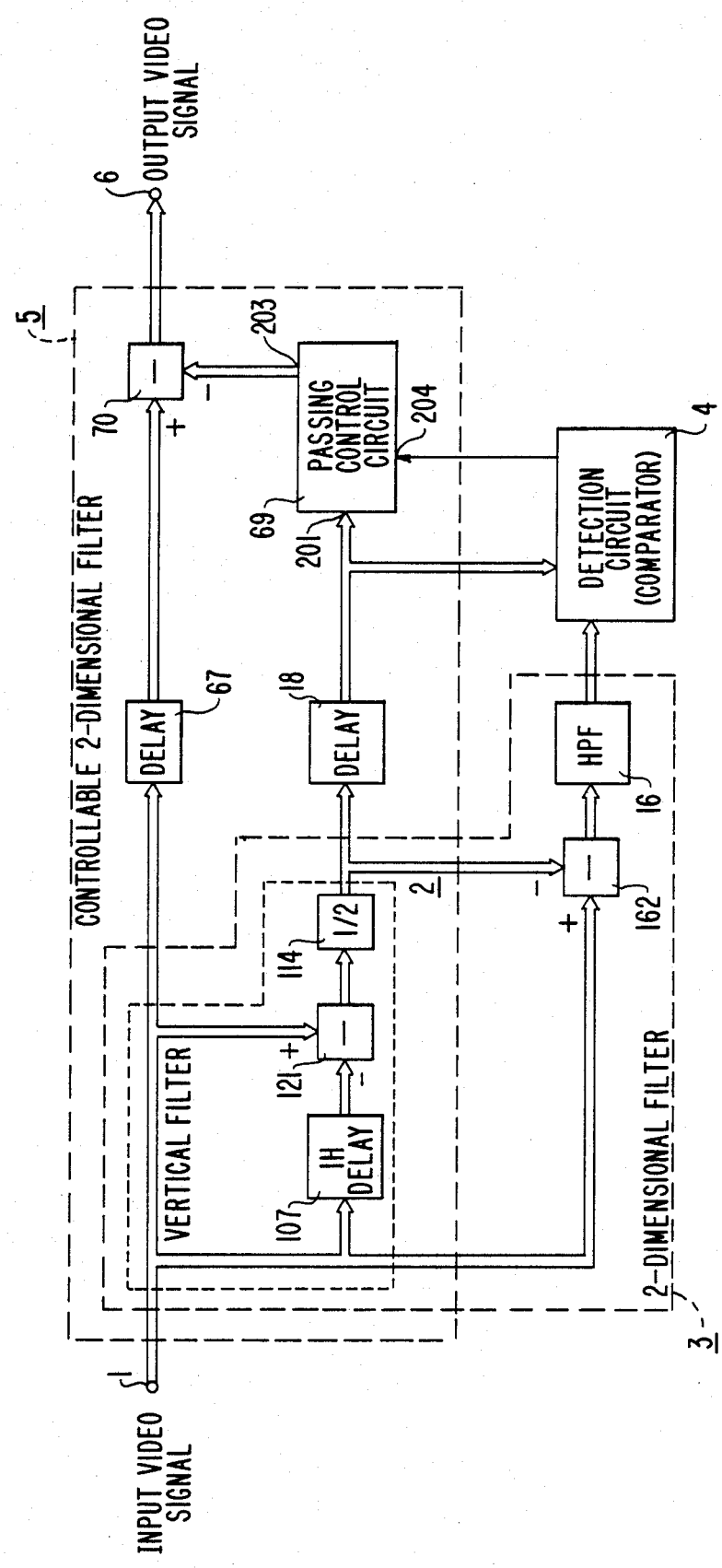
FIG. 8 is a block diagram showing the third embodiment of the present invention.

FIG. 8 is a construction diagram showing the third embodiment of the present invention. In FIG. 8, the same numbers have been assigned to the bocks having the same functions as in the second embodiment shown in FIG. 3. In the vertical filter 2, an input digital video signal is delayed by one horizontal scanning period by a 1H delay circuit 107, then subtracted from the input video signal by a subtraction circuit 121, and then its signal amplitude is multiplied by ½ in a coefficient circuit 114. As the result, the input video signal and the 1H-delayed video signal are mixed at the weights of ½ and −½ respectively to become a component of high vertical frequency in the region 402 in FIG. 1. The thus obtained output signal of the vertical filter 2 is subtracted from the input video signal from the input terminal 1 by a subtraction circuit 162 to mix the input video signal and the 1H-delayed video signal at the weights of ½ and ½ respectively. As the result, a component of low vertical frequency is obtained. Further, this component is passed through the high-pass filter 16 of horizontal frequency to obtain a component which is low in vertical frequency and high in horizontal frequency in the region 401 in FIG. 1. as an output signal of the two-dimensional filter 3. The subsequent processes are the same as those in the second embodiment in FIG. 3. By constructing as such, it is possible to obtain nearly the same effect as that of the second embodiment in FIG. 3 by a simpler construction using only one 1H delay circuit.

Next, explanation will be given on the fourth embodiment of the present invention.

FIG. 9 is a block diagram showing the fourth embodiment of the present invention. In FIG. 9, the same numbers are assigned to the blocks having the same functions as in the second embodiment shown in FIG. 3. The configuration of the vertical filter 2 is the same as that in FIG. 3. In the two-dimensional filter 3, an input digital video signal, the 1H-delayed video signal from the 1H delay circuit 7 and the 2H-delayed video signal from the 1H delay circuit 8 are multiplied by ¼, ½ and ¼ by coefficient circuits 9, 10 and 11, respectively, and then mixed by an addition circuit 12. As the result, a component of low vertical frequency is obtained. Further, by passing this component through the high-pass filter 16 of horizontal frequency, a component which is low in vertical frequency and high in horizontal frequency in the region 401 in FIG. 1 is obtained. Also, the output of the vertical filter 2 is subjected to correction of the delay time of the high-pass filter 16 by the delay circuit 18, and fed to an addition circuit 20 through the passing control circuit 19 for controlling the passage of the signal according to the detection signal from the detection circuit 4. On the other hand, the output of the addition circuit 12 is subjected to correction of the delay time of the high-pass filter 16 by the delay circuit 17 to become the other input of the addition circuit 20. An output of the addition circuit 20 is used as an output of the controllable two-dimensonal filter 5, and a video signal with reduced noise is outputted from the output terminal 6.

Figure 10:
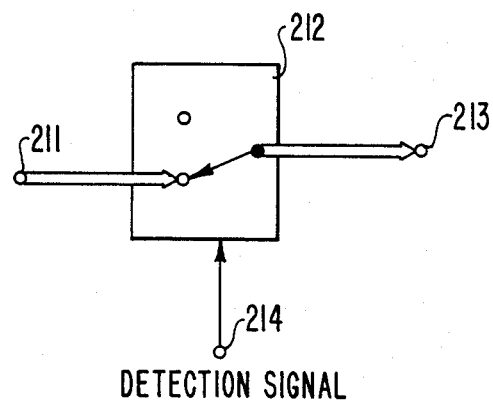
FIG. 10, FIG. 11 and FIG. 13 are construction diagrams of the passing control circuits in the fourth and the fifth embodiments of the present invention.
Figure 11:
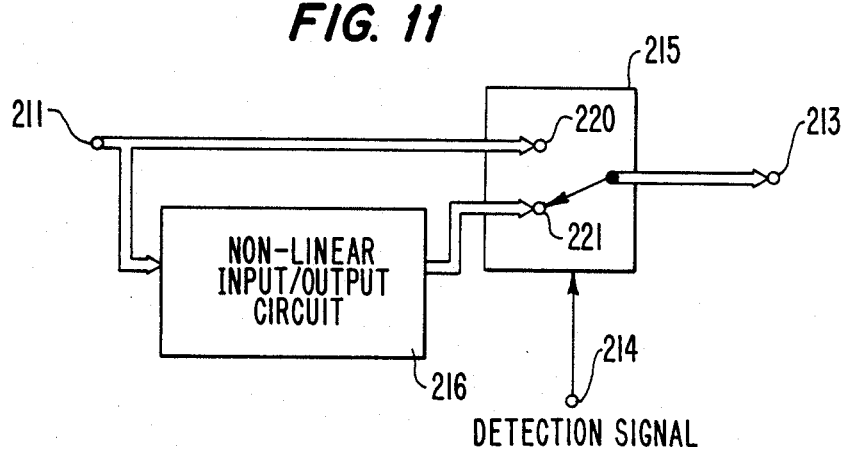

In the case of the embodiment of FIG. 9, the passing control circuit 19 is constructed, for example, as shown in FIG. 10. In FIG. 10, a switch 212 is so constructed as to selectively connect input and output terminals 211 and 213 under control by the detection signal inputted from the detection circuit 4 to a detection signal input terminal 214. The switch 212 is opened only when the detection signal indicates that a vertical line image portion is detected. The fourth embodiment of FIG. 9 has the same function as that of the second embodiment shown in FIG. 3 in which the construction of FIG. 4 is used for the passing control circuit 69.

Figure 12:
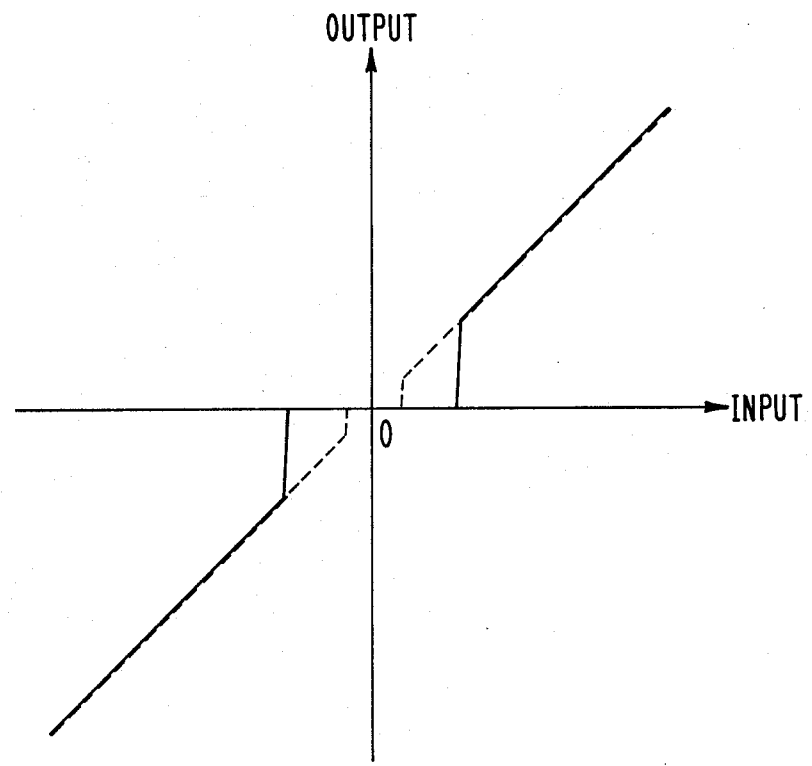
FIG. 12 is a diagram showing an input-output characteristic of the non-linear input/output circuits 216 and 217 in FIG. 11 and FIG. 13.
Figure 13:
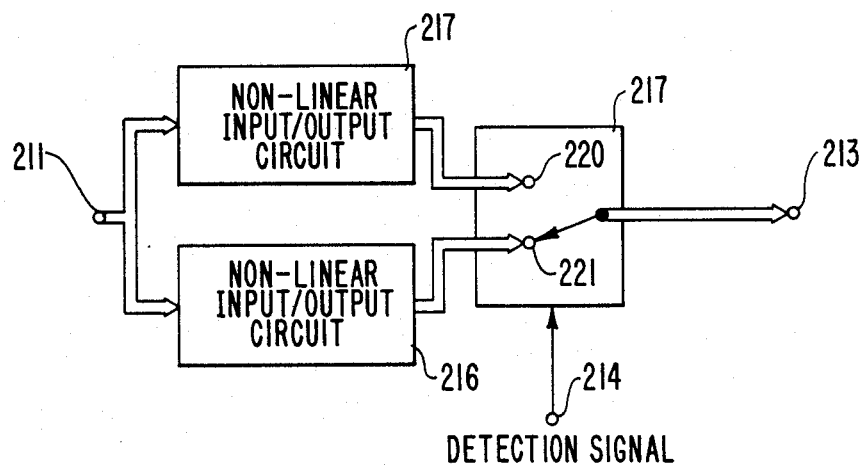

Alternatively, in FIG. 9, the passing control circuit 19 may be constructed as shown in FIG. 1 or FIG. 13. Here, a switch 215 is controlled by the detection signal from the detection circuit 4 to the detection signal input terminal 214. When a vertical line image portion is detected, the switch 215 selects its contact 221, and in the other case it selects its contact 220. Non-linear input/output circuits 216, 217 are each constituted by a memory which utilizes the input signal thereto as an address and stores prescribed output values corresponding to respective levels of the input signal. The input-output characteristics of the non-linear input/output circuits 216, 217 are set to slice characteristics which do not pass smaller amplitude components than predetermined levels, as shown by a solid line and a broken line, respectively, in FIG. 12. By this construction, there can be obtained entirely the same effect as that when the constructions of FIG. 5 and FIG. 7 are used for the passing control circuit 69 in the second embodiment shown in FIG. 3.

Next, explanation will be made on the fifth embodiment of the present invention.

Figure 14:
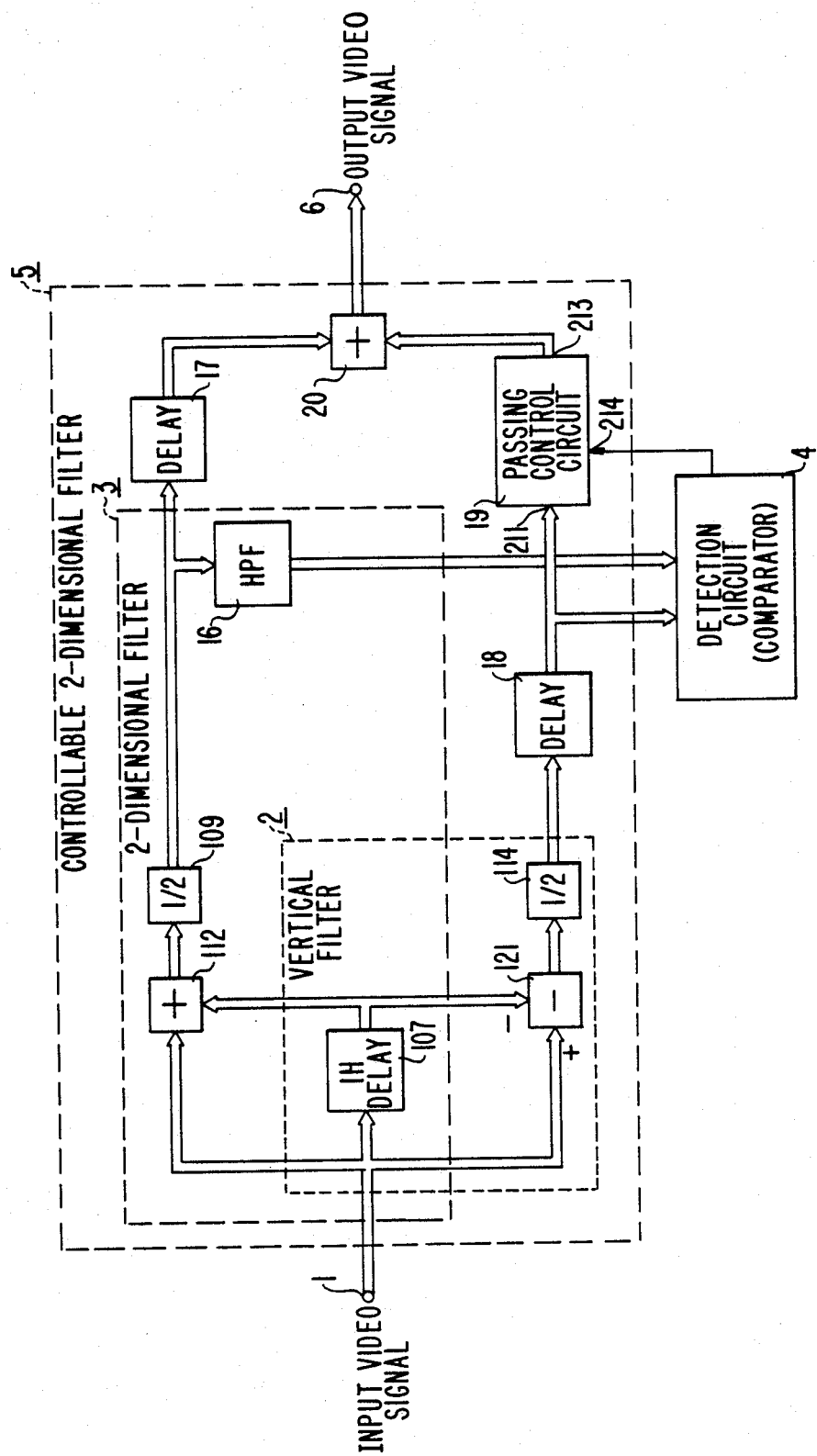
FIG. 14 is a block diagram showing the fifth embodiment of the present invention.

FIG. 14 is a block diagram showing the fifth embodiment of the present invention. In FIG. 14, the same numbers are assigned to the blocks having the same functions as in the fourth embodiment shown in FIG. 9. In the vertical filter 2, an input digital video signal is delayed by 1 horizontal scanning period by the 1H delay circuit 107, and a difference between the input video signal and the output signal of the 1H delay circuit 107 is taken by a subtraction circuit 121. This difference is multiplied by ½ by a coefficient circuit 114. Accordingly, the input video signal and the 1H-delayed video signal are mixed at the weights of ½ and −½, respectively, thereby to obtain a component of high vertical frequency in the region 402 in FIG. 1. In the two-dimensional filter 3, the input video signal and the output signal of the 1H delay circuit 107 are added by an addition circuit 112, and the sum is multiplied by ½ by a coefficient circuit 114. The resultant output is a mixed signal of the input video signal and the 1H-delayed video signal at the weights of ½ and ½ respectively, which is a component of low vertical frequency. Further, this component is passed through the high-pass filter 16 of horizontal frequency to obtain a component which is low in vertical frequency and high in horizontal frequency in the region 401 in FIG. 1. The subsequent process is the same as that in the fourth embodiment of FIG. 9. By constructing as such, in the simpler construction using only one 1H delay circuit, approximately the same effect as in the fourth embodiment in FIG. 9 can be obtained.

In the above, explanation has been made by employing several embodiments as examples. However, the present invention is not limited to such embodiments. Various changes and modifications are possible for the constructions of vertical filter, two-dimensional filter, controllable two-dimensional filter, detection circuit, etc. For example, the detection circuit 4 may be designed not only to simply compare the amount of the input signal levels but to detect the difference of the input signal levels so as to output a detection signal proportionate to the difference with the controllable two-dimensional filter modified to perform more complicated processings according to such detection signal. Further, the present invention is not limited to the practice by digital processing as in the above embodiments but it may be practised by analog processing.

What is claimed is:

1. A noise reduction apparatus comprising:
   a vertical filter means for extracting a component in a high vertical frequency region from an input video signal;
   a two-dimensional filter means for extracting a component in a low vertical frequency region and a high horizontal frequency region from the input video signal;
   a detecting means which receives an output signal of said vertical filter means and an output signal of said two-dimensional filter means and outputs a detection signal according to amplitudes of said output signals; and
   a controllable two-dimensional filter means controlled by said detection signal output from said detecting means for suppressing a noise component in said high vertical frequency region to obtain a video signal with reduced noise.

2. An apparatus according to claim 1, wherein said vertical filter means comprises a first delay means for delaying said input video signal by 1 horizontal scanning period (1H), a second delay means for delaying an output of said first delay means by further 1H, and a first operation means for mixing said input video signal, the output of said first delay means and an output of said second delay means at the weights of −¼, ½ and −¼, respectively, to obtain the output signal of said vertical filter, and wherein said two-dimensional filter means comprises a second operation means for mixing said input video signal, the output of said first delay means and the output of said second delay means at the weights of ¼, ½ and ¼, respectively, to obtain a component in said low vertical frequency region of said input video signal, and a high-pass filter means for passing an output signal of said second operation means in said high horizontal frequency region to obtain the output signal of said two-dimensional filter means.

3. An apparatus according to claim 2, wherein said controllable two-dimensional filter means comprises a passing control means for controlling passing of the output signal of said vertical filter means according to said detection signal from said detecting means, and a mixing means for mixing the output of said first delay means and an output of said passing control means.

4. An apparatus according to claim 3, wherein said detecting means comprises an amplitude comparison circuit which compares the amplitude of the output signal of said vertical filter means with the amplitude of the output signal of said two-dimensional filter means, and, when the amplitude of the output signal of said two-dimensional filter means is larger than the amplitude of the output signal of said vertical filter means, outputs a detection signal.

5. An apparatus according to claim 4, wherein said passing control means comprises a switch means which is connected between said vertical filter means and said mixing means, and is closed in response to said detection signal.

6. An apparatus according to claim 4, wherein said passing control means comprises a non-linear input/output circuit connected to said vertical filter means and having an amplitude limitation characteristic, and a switch means which is connected between said non-linear input/output circuit and said mixing means, and is closed in response to said detection signal.

7. An apparatus according to claim 4, wherein said passing control means comprises first and second non-linear input/output circuits which are connected to said vertical filter means and have different amplitude limitation input-output characteristics, and a selection means which selects one of outputs of said first and second non-linear input/output circuits according to said detection signal.

8. An apparatus according to claim 2, wherein said controllable two-dimensional filter means comprises a passing control means for controlling passing of the output signal of said vertical filter means according to said detection signal from said detecting means, and a mixing means for mixing the output signal of said second operation means with an output signal of said passing control means.

9. An apparatus according to claim 8, wherein said detecting means comprises an amplitude comparison means which compares the amplitude of the output signal of said vertical filter means with the amplitude of the output signal of said two-dimensional filter means, and, when the amplitude of the output signal of said two-dimensional filter means is larger than the amplitude of the output signal of said vertical filter means, outputs a detection signal.

10. An apparatus according to claim 9, wherein said passing control means comprises a switch means which is connected between said vertical filter means and said mixing means, and is opened in response to said detection signal.

11. An apparatus according to claim 9, wherein said passing control means comprises a non-linear input/output circuit which has a slice characteristic and is connected to said vertical filter means, and a selection means which is for selecting one of the output signal of said vertical filter means and an output signal of said non-linear input/output circuit and selects the output signal of said non-linear input/output circuit in response to said detection signal.

12. An apparatus according to claim 9, wherein said passing control means comprises first and second non-linear input/output circuits which are connected to said vertical filter means and have different slice input-output characteristics, and a selection means which selects one of outputs of said first and second non-linear input/output circuits according to said detection signal.

13. An apparatus according to claim 1, wherein said vertical filter means comprises a delay means for delaying said input video signal by 1 horizontal scanning period (1H), and a first operation means for mixing said input video signal and an output of said delay means at the weights of $-\frac{1}{2}$ and $\frac{1}{2}$, respectively, to obtain the output signal of said vertical filter, and wherein said two-dimensional filter means comprises a second operation means for mixing said input video signal and the output of said delay means at the weights of $\frac{1}{2}$ and $\frac{1}{2}$, respectively, to obtain a component in said low vertical frequency region, and a high-pass filter means for passing the output signal of said second operation means in said high horizontal frequency region to obtain the output signal of said two-dimensional filter means.

14. An apparatus according to claim 13, wherein said controllable two-dimensional filter means comprises a passing control means for controlling passing of the output signal of said vertical filter means according to said detection signal from said detection means, and a mixing means for mixing said input video signal and an output signal of said passing control means.

15. An apparatus according to claim 13, wherein said controllable two-dimensional filter means comprises a passing control means for controlling passing of the output signal of said vertical filter means according to said detection signal from said detecting means, and a mixing means for mixing the output signal of said second operation means and the output signal of said passing control means.

16. An apparatus according to claim 1, wherein said detecting means comprises an amplitude comparison means which compares the amplitude of the output signal of said vertical filter means with the amplitude of the output signal of said two-dimensional filter means, and, when the amplitude of the output signal of said two-dimensional filter means is larger than the amplitude of the output signal of said vertical filter means, outputs a detection signal.

* * * * *